US012128854B2

(12) United States Patent
Fritsch et al.

(10) Patent No.: US 12,128,854 B2
(45) Date of Patent: Oct. 29, 2024

(54) CLEANING DEVICE

(71) Applicant: Vitesco Technologies GMBH, Regensburg (DE)

(72) Inventors: Karl Martin Fritsch, Frankfurt (DE); Stefan Klöckner, Kelkheim (DE)

(73) Assignee: Vitesco Technologies GmbH, Regensburg (DE)

( * ) Notice: Subject to any disclaimer, the term of this patent is extended or adjusted under 35 U.S.C. 154(b) by 135 days.

(21) Appl. No.: 17/895,899

(22) Filed: Aug. 25, 2022

(65) Prior Publication Data

US 2023/0088016 A1 Mar. 23, 2023

Related U.S. Application Data

(63) Continuation of application No. PCT/EP2020/084768, filed on Dec. 4, 2020.

(30) Foreign Application Priority Data

Feb. 26, 2020 (DE) ...................... 10 2020 202 446.4

(51) Int. Cl.
*B60S 1/48* (2006.01)
*B60S 1/54* (2006.01)
*F04B 53/10* (2006.01)
*F04D 31/00* (2006.01)

(52) U.S. Cl.
CPC ................. *B60S 1/481* (2013.01); *B60S 1/54* (2013.01); *F04B 53/1037* (2013.01); *F04D 31/00* (2013.01)

(58) Field of Classification Search
CPC ... B60S 1/481; B08B 3/02; B08B 5/02; F04D 31/00
USPC ........................................................ 417/442
See application file for complete search history.

(56) References Cited

U.S. PATENT DOCUMENTS

| 8,235,677 B2 | 8/2012 | Cai | |
|---|---|---|---|
| 2015/0050169 A1 | 2/2015 | Horie et al. | |
| 2017/0182980 A1* | 6/2017 | Davies | B05B 9/04 |
| 2017/0238795 A1* | 8/2017 | Blumenkranz | B08B 3/02 |

FOREIGN PATENT DOCUMENTS

| DE | 102008045967 A1 | 3/2009 |
|---|---|---|
| DE | 102014213282 A1 | 1/2016 |
| DE | 102018113951 A1 | 12/2019 |
| JP | 2002136939 A | 5/2002 |

\* cited by examiner

*Primary Examiner* — Kenneth J Hansen

(57) ABSTRACT

A cleaning device for a vehicle, with which at least one cleaning location is cleaned with pressurized cleaning liquid and/or pressurized ambient air, is proposed, including: a pump-compressor stage for sucking up and conveying the cleaning liquid and/or the ambient air, a fluid path which fluidically connects the pump-compressor stage upstream to a cleaning liquid tank and to an environment of the cleaning device, and a fluid distribution apparatus downstream of the pump-compressor stage, which is fed with the cleaning liquid and/or the ambient air by the pump-compressor stage, the fluid distribution apparatus being fluidically connected to the cleaning location. A vehicle with such a cleaning device, the first and the second use, and a cleaning method for a vehicle are also proposed.

11 Claims, 3 Drawing Sheets

CLEANING DEVICE

CROSS-REFERENCE TO RELATED APPLICATIONS

This application claims priority to PCT Application PCT/EP2020/084768, filed Dec. 4, 2020, which claims priority to German Patent Application No. DE 10 2020 202 446.4, filed Feb. 26, 2020. The disclosures of the above applications are incorporated herein by reference.

FIELD OF THE INVENTION

The invention relates to a cleaning device for a vehicle, to a vehicle with such a cleaning device, to the first and the second use, and to a cleaning method for a vehicle.

BACKGROUND OF THE INVENTION

A vehicle is to be understood here to mean any type of vehicle that is operated either with an internal combustion engine and/or with an electric motor, such as passenger motor vehicles and/or utility vehicles. These are partially autonomously or fully autonomously operated vehicles.

SUMMARY OF THE INVENTION

An object on which the invention is based is to make improved cleaning of a vehicle possible. A further object on which the invention is based is to improve a cleaning device for a vehicle.

This object is achieved by a cleaning device proposed and placed under protection according to the present invention. A vehicle with such a cleaning device is also proposed. Furthermore, the use of a pump-compressor stage and the use of the proposed cleaning device are proposed. Furthermore, a cleaning method for a vehicle is proposed. In addition, a computer program and a computer program product for carrying out the cleaning method are proposed. Various embodiments of the invention are also described herein.

A cleaning device for a vehicle, with which at least one cleaning location of the vehicle is cleaned selectively with pressurized cleaning liquid and/or pressurized ambient air, is proposed.

The proposed cleaning device includes:
a pump-compressor stage for selectively sucking up and conveying either the cleaning liquid and/or the ambient air,
a fluid path which fluidically connects the pump-compressor stage upstream to a cleaning liquid tank and to an environment of the cleaning device, and
a fluid distribution apparatus downstream of the pump-compressor stage, which is fed with the pressurized cleaning liquid and/or the pressurized ambient air by the pump-compressor stage, the fluid distribution apparatus being fluidically connected to the cleaning location.

A cleaning location may be understood here to mean a cleaning location associated with a vehicle sensor—for example a cleaning location associated with a camera, etc.—wherein the cleaning location itself may even be part of the respective vehicle sensor or may be arranged spaced apart therefrom, for example a location on a windshield or the like. A cleaning location may however also be another location on the vehicle which is not associated with a vehicle sensor as such, for example another location on the windshield, a location on a headlight or the like.

Here, in the simplest case, a cleaning liquid may be understood to mean water, but also may be an aqueous cleaning agent solution, that is to say water in conjunction with a cleaning agent additive. The cleaning liquid may also contain an antifreeze agent, which as such lowers the freezing point of the cleaning liquid.

In addition or as an alternative to the air in an actual vehicle environment, ambient air may also be understood to mean the air in a vehicle interior, the air expediently being filtered and possibly also preheated. In order to filter this vehicle interior air, use may be made of an air filter which is already provided in any case in an HVAC system (Heating, Ventilation and Air Conditioning) or in an air conditioning system. This contributes to a reduction in costs.

The use of such preheated vehicle interior air or warm air provides that the freezing of the cleaning liquid on the respective cleaning location in the event of cold outside temperatures of a vehicle environment is counteracted, for example on a cleaning location which may be associated with sensor optics.

The proposed cleaning device reduces the number of components required for such a device. It thus simplifies such a device. The costs of such a cleaning device are also reduced as a result. Since the pump-compressor stage is designed both for conveying the cleaning liquid and for conveying the ambient air, there is no need for a further, separate fluid-conveying component for conveying either the cleaning liquid or the ambient air, together with an associated, separate fluidic connection of the component to the device. This also simplifies the control of such a cleaning device because fewer components have to be controlled.

Both upstream and downstream of the proposed pump-compressor stage, the respective fluid path through which the cleaning liquid has previously flowed is dried or purged by the ambient air flowing through it—this applies at least partially with regard to the fluid path upstream of the pump-compressor stage, i.e. with regard to a section conducting the ambient air.

As a result, the respective fluid path, which is purged as a result of the conveying of ambient air, cannot freeze.

Furthermore, the conveying of ambient air also counteracts the formation of a biomass in the fluid path and thus also a resultant fouling of the fluid path. Both the formation of the biomass and the fouling may be entirely prevented.

Furthermore, the proposed cleaning device significantly increases the range of a quantity of cleaning liquid used compared to a device which as such conveys only cleaning liquid.

Upstream of the proposed pump-compressor stage, a shut-off and release valve in the fluid path is used to selectively shut off and/or release either a cleaning liquid branch and/or an ambient air branch of the fluid path.

By the pump-compressor stage being selectively used—in accordance as described above—in what is referred to as a mixing mode to be able to even suck up and convey cleaning liquid and ambient air simultaneously, the range of the cleaning liquid may be increased even further. In such a conveying mode, for example, the ambient air branch would at times be fully opened or released, while the cleaning liquid branch would only be partially opened or released during this time (what is referred to as a mixing mode of the cleaning device).

In each case at least one separate release and shut-off valve, for example in the form of a release flap and shut-off flap, is assigned here to the cleaning liquid branch and to the ambient air branch.

In addition or as an alternative to this, a multi-way valve may be arranged between the cleaning liquid branch and the ambient air branch, the multi-way valve selectively permitting either conveying of cleaning liquid and/or conveying of ambient air, or switching between these two conveying modes of the device. Such a centrally acting switchover valve could also save on construction space.

It is also proposed to drive the pump-compressor stage electrically, with the pump-compressor stage being easily controllable with regard to the respective fluid-specific conveying requirement. The pump-compressor stage may be designed in the form of a positive displacement pump stage and/or a flow pump stage.

A vehicle with a cleaning device of the type described above is also proposed.

Furthermore, the use of the abovementioned pump-compressor stage for selectively sucking up and conveying either a cleaning liquid and/or ambient air, and for pressurizing a fluid path leading to a fluid distribution apparatus, is proposed, the fluid distribution apparatus being fluidically connected to at least one cleaning location of the vehicle.

It is also proposed to use a cleaning device of the type described above for at least cleaning a plurality of cleaning locations each associated with a sensor.

Furthermore, a cleaning method for a vehicle, in which at least one cleaning location is cleaned selectively with pressurized cleaning liquid and/or pressurized ambient air, is proposed.

In this case, the pump-compressor stage is used selectively to suck up and convey either the cleaning liquid and/or the ambient air, and furthermore to feed a fluid distribution apparatus downstream of the pump-compressor stage with the pressurized cleaning liquid and/or the pressurized ambient air, the fluid distribution apparatus being fluidically connected to at least one cleaning location of the vehicle.

In the case of the electrically driven pump-compressor stage, the rotational speed thereof is easily adapted to the respective fluid-specific conveying requirement. This is because the rotational speed required for conveying ambient air is at a significantly higher level than the rotational speed required for conveying cleaning liquid. Only by such a significant increase in rotational speed may the kinematic conditions required at the pump impeller be generated, these ultimately bringing about a desired increase in air pressure suitable for the cleaning.

Furthermore, a computer program and a computer program product for carrying out the cleaning method are proposed, wherein the computer program and the computer program product map this method by use of software.

BRIEF DESCRIPTION OF THE DRAWINGS

The invention will be explained below in detail with reference to illustrations in the Figures. Further advantageous refinements of the invention emerge from the description below of preferred embodiments. To this end, schematically.

DETAILED DESCRIPTION OF THE PREFERRED EMBODIMENTS

Figure 1:
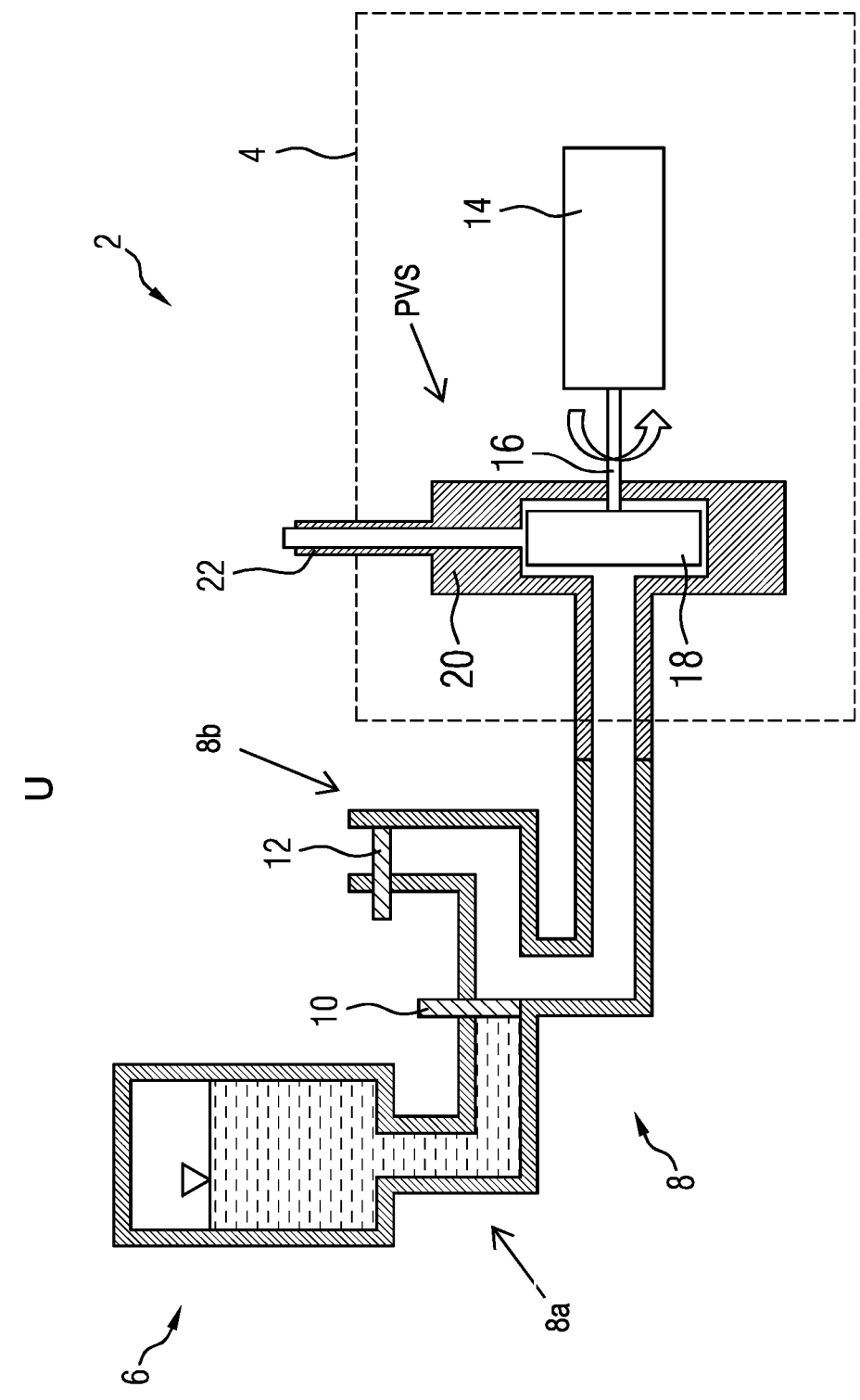
FIG. 1 shows a proposed, inactive cleaning device.

The following description of the preferred embodiment(s) is merely exemplary in nature and is in no way intended to limit the invention, its application, or uses.

The proposed cleaning device 2 has a fluid conveying unit 4 which includes a pump-compressor stage PVS, for example in the form of a flow pump stage, and an electric motor 14 driving the pump-compressor stage PVS. The electric motor 14 drives a pump-compressor impeller or pump-compressor conveying wheel 18 via a shaft 16. In the case of the flow pump stage, this is, for example, a side channel pump impeller and/or a peripheral channel pump impeller. A pump-compressor stage housing 20 accommodating the impeller or conveying wheel 18 is fluidically connected to a fluid distribution apparatus via a discharge connection 22, from which a fluid line—not shown here—leads away. In an embodiment, the pump-compressor stage PVS is designed, for example, in the form of a centrifugal pump.

The respective cleaning medium or cleaning fluid is supplied to a plurality of possible cleaning locations of a vehicle via the fluid distribution apparatus. These may be cleaning locations associated in each case with a vehicle sensor—such as a cleaning location on a windshield associated with a camera, etc.—and/or other cleaning locations, such as another location on the windshield, a location on a headlight, and the like.

The pump-compressor stage housing 20 is also connected via an inflow connection to a fluid path 8 which fluidically connects the pump-compressor stage PVS to a cleaning liquid container 6 and to an environment U of the cleaning device 2. The fluid path 8, via which either a cleaning liquid and/or ambient air may be conveyed selectively and as needed, includes a cleaning liquid branch 8a and an ambient air branch 8b, which as such merge into one another or diverge at a branching point or bifurcation point of the fluid path 8. For the sake of completeness, it should be mentioned that an air filter—not illustrated in the Figures—is also provided in the ambient air branch 8b to the environment. With regard to the filtered ambient air, it should be pointed out that it may either be air sucked up from a vehicle environment and/or air sucked up from a vehicle interior (cf. also the definition of ambient air in the introduction).

In a proposed embodiment of the cleaning device 2, the cleaning liquid branch 8a and the ambient air branch 8b are each assigned a separate release and shut-off valve, for example in the form of a release flap and shut-off flap 10, 12, which releases and/or shuts off the respective branch in order to selectively permit either a desired conveying of cleaning liquid and/or a desired conveying of ambient air.

In a proposed, further embodiment of the cleaning device 2, in addition to or as an alternative to the previously mentioned separate release and shut-off valve 10, 12, a multi-way valve may be arranged between the cleaning liquid branch 8a and the ambient air branch 8b in an appropriately adjustable manner and, if needed and selectively, either permits the desired conveying of cleaning liquid and/or the desired conveying of ambient air or switches between these conveying modes of the device 2 accordingly.

The cleaning device 2 is part of a vehicle, such as in the form of an at least partially autonomously, or a fully autonomously operated vehicle.

Figure 2:
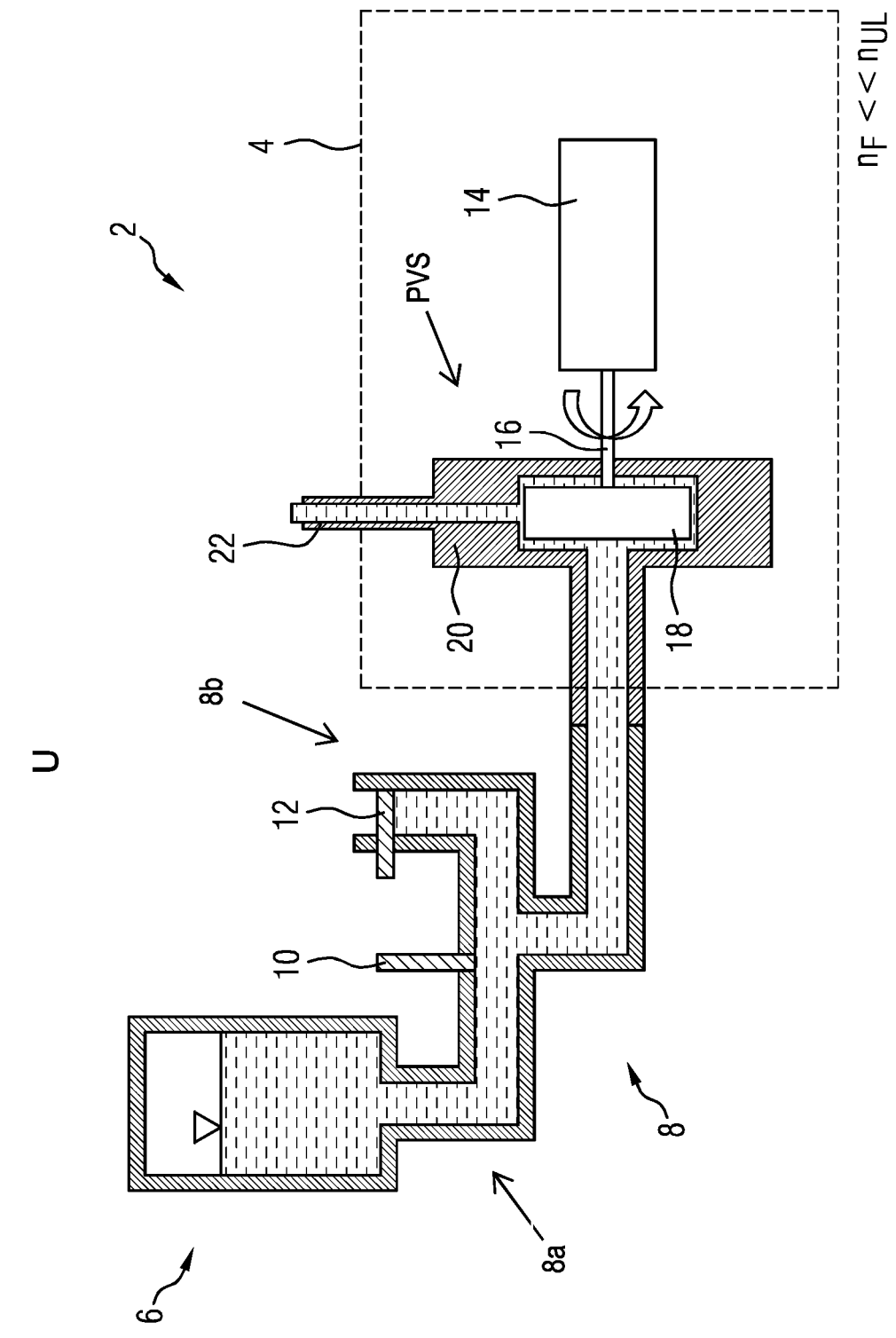
FIG. 2 shows the cleaning device shown in FIG. 1 during conveying of cleaning liquid.
Figure 3:
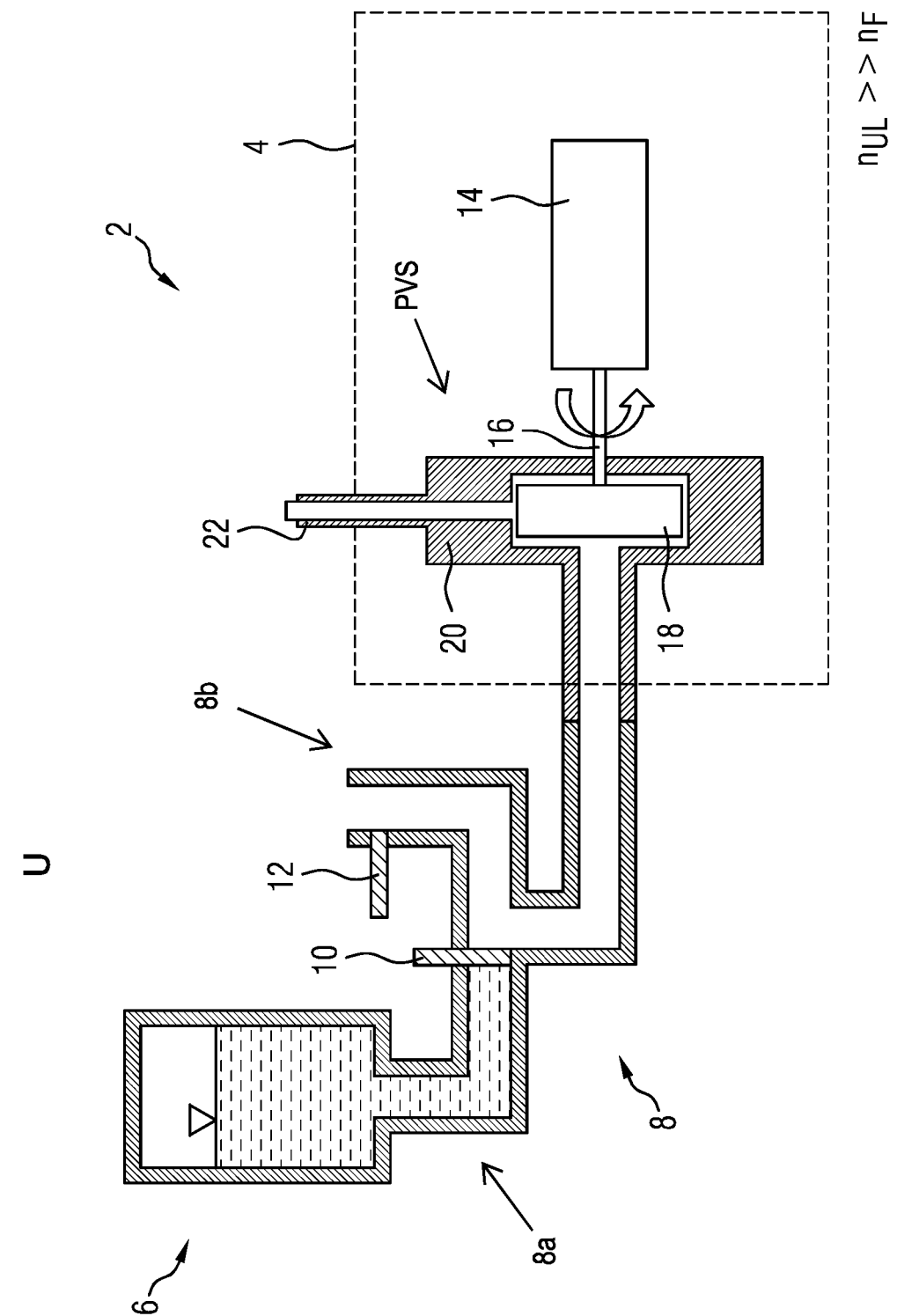
FIG. 3 shows the cleaning device shown in FIG. 1 during conveying of ambient air.

By using the cleaning device 2, either the cleaning liquid and/or the ambient air may thus be supplied under pressure to at least one of the cleaning locations mentioned, selectively and as needed. The rotational speed of the pump-compressor stage PVS or of the impeller/conveying wheel 18 is adapted here to the respective fluid-specific conveying requirement. This is because the rotational speed $n_{UL}$ required for conveying ambient air (UL=ambient air; cf. FIG. 3) is at a higher or even significantly higher level ($n_{UL} > n_R$ or $n_{UL} \gg n_R$) compared to the rotational speed $n_R$ required for conveying the cleaning liquid (R=cleaning liquid; cf. FIG. 2).

The proposed cleaning device 2 eliminates the need for two separate fluid conveying units together with the respective separate fluidic connections to the device 2. Consequently, the proposed cleaning device 2 reduces the number of components required for such a device and thus also the costs of the device.

Such a reduction in device components is also of benefit in terms of making such a device correspondingly compact, and therefore overall less construction space is required.

The rotational speed of the impeller/conveying wheel 18 is adapted here to the respective ambient air-specific conveying requirement in such a way that the purging of the respective fluid path and the cleaning of the respective cleaning location by pressurized ambient air are at least readily implemented.

Compared to a cleaning device that conveys only a cleaning liquid, the range that is achieved with the cleaning liquid of the cleaning liquid container 6 is significantly increased according to the invention.

This applies in an example to future fully autonomously driving vehicles which, compared to previous vehicles, may have a significantly higher number of sensors—such as safety-relevant sensors—whose functionality must be ensured.

Although exemplary embodiments are explained in the above description, it should be noted that numerous modifications are possible. It should be noted, furthermore, that the exemplary embodiments are merely examples which are in no way intended to limit the scope of protection, the applications, and the structure. Instead, the above description gives a person skilled in the art a guideline for the implementation of at least one exemplary embodiment, wherein various changes may be made, especially with regard to the function and arrangement of the integral parts described, without departing from the scope of protection as it is apparent from the combinations of features equivalent thereto.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cleaning device for a vehicle, with which at least one cleaning location is cleaned as needed and selectively with at least one of pressurized cleaning liquid or pressurized ambient air, the cleaning device comprising:
   a pump-compressor stage for selectively sucking up and conveying either the cleaning liquid and/or the ambient air;
   a cleaning tank;
   a fluid path which fluidically connects the pump-compressor stage upstream to the cleaning liquid tank and to an environment of the cleaning device; and
   a fluid distribution apparatus downstream of the pump-compressor stage, which is fed with the pressurized cleaning liquid and/or the pressurized ambient air by the pump-compressor stage, the fluid distribution apparatus being fluidically connected to the at least one cleaning location;
   a shut-off and release valve disposed in the fluid path;
   a cleaning liquid branch being part of the fluid path; and
   an ambient air branch being part of the fluid path;
   wherein the shut-off and release valve is used to selectively shut off or release at least one of the cleaning liquid branch or the ambient air branch.

2. The cleaning device of claim 1, wherein the shut-off and release valve comprises:
   a plurality of shut-off and release valves;
   wherein a first of the plurality of shut-off and release valves is assigned to the cleaning liquid branch, and another of the plurality of shut-off and release valves is assigned to the ambient air branch.

3. The cleaning device of claim 1, the shut-off and release valve further comprising a multi-way valve arranged between the cleaning liquid branch and the ambient air branch.

4. The cleaning device of claim 1, wherein the pump-compressor stage is drivable electrically.

5. The cleaning device of claim 1, wherein the pump-compressor stage comprises a flow pump stage.

6. The cleaning device of claim 1, wherein the pump-compressor stage pressurizes the fluid path leading to the fluid distribution apparatus.

7. The cleaning device of claim 1, further comprising:
   a sensor; and
   a plurality of cleaning locations;
   wherein at least one of the plurality of cleaning locations is associated with the sensor.

8. A cleaning method for a vehicle, in which at least one cleaning location is cleaned according to a fluid-specific conveying requirement, and selectively with at least one of pressurized cleaning liquid or pressurized ambient air, the method comprising the steps of:
   providing a pump-compressor stage;
   providing a fluid distribution apparatus downstream of the pump-compressor stage;
   providing at least one cleaning location of the vehicle being fluidically connected to the fluid distribution apparatus;
   providing a shut-off and release valve disposed in a fluid path, the fluid path in fluid communication with the pump-compressor stage;
   providing a cleaning liquid branch being part of the fluid path; and
   providing an ambient air branch being part of the fluid path;
   using the pump-compressor stage to selectively suck up and convey one of the cleaning liquid or the ambient air, and to feed the fluid distribution apparatus;
   using the shut-off and release valve to selectively shut off or release at least one of the cleaning liquid branch or the ambient air branch.

9. The method of claim 8, further comprising the steps of adapting the rotational speed of the pump-compressor stage to the respective fluid-specific conveying requirement.

10. The method of claim 9, further comprising the steps of providing a computer program for controlling the pump-compressor stage and the fluid distribution apparatus and adapting the rotational speed of the pump-compressor stage to the respective fluid-specific conveying requirement.

11. The method of claim 9, further comprising the steps of:
- providing a computer program product for controlling the pump-compressor stage and the fluid distribution apparatus;
- providing program code being part of the computer program product; and
- providing a computer-readable data storage medium, the program code stored on the computer-readable data storage medium;
- executing the program code on a computer.

* * * * *